(12) United States Patent
Hashimoto et al.

(10) Patent No.: US 6,587,165 B2
(45) Date of Patent: Jul. 1, 2003

(54) THIN FILM SEMICONDUCTOR DEVICE AND LIQUID CRYSTAL DISPLAY UNIT, AND FABRICATION METHODS THEREOF

(75) Inventors: Makoto Hashimoto, Kanagawa (JP); Takusei Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/922,137

(22) Filed: Aug. 3, 2001

(65) Prior Publication Data

US 2002/0089616 A1 Jul. 11, 2002

(30) Foreign Application Priority Data

Aug. 10, 2000 (JP) ......................... 2000-242170

(51) Int. Cl.[7] ....................... G02F 1/136; G02F 1/1333; G02F 1/13
(52) U.S. Cl. ..................... 349/44; 349/43; 349/110; 349/187
(58) Field of Search ............................ 349/42, 43, 44, 349/110, 111, 187; 257/59, 72, 435

(56) References Cited

U.S. PATENT DOCUMENTS 5,811,866 A * 9/1998 Hirata ..................... 257/435

6,259,200 B1 * 7/2001 Morita et al. .............. 313/498
6,327,006 B1 * 12/2001 Sato et al. .................... 349/44
2002/0118322 A1 * 8/2002 Murade ...................... 349/110

* cited by examiner

*Primary Examiner*—Tarifur R. Chowdhury
(74) *Attorney, Agent, or Firm*—Sonnenschein, Nath & Rosenthal

(57) ABSTRACT

A thin film semiconductor device includes pluralities of signal and gate interconnections crossing each other on an insulating substrate. Pixels are disposed at crossing points between the signal and gate interconnections. Each pixel has at least a pixel electrode, a thin film transistor for driving the pixel electrode, and a light shield band for shielding the thin film transistor from external light. A source of the thin film transistor is connected to the signal interconnection, a drain thereof is connected to the pixel electrode, and a gate electrode thereof is connected to the gate interconnection. The light shield band is formed of a first conductive layer, and at least part of the light shield band is used as the gate interconnection. The gate electrode is formed of a second conductive layer different from the first conductive layer. The first conductive layer used for the gate interconnection is electrically connected via a contact hole to the second conductive layer forming the gate electrode within each pixel region. A pixel opening ratio of the thin film semiconductor device used as a drive substrate for an active matrix type liquid crystal display unit is thus improved.

24 Claims, 7 Drawing Sheets

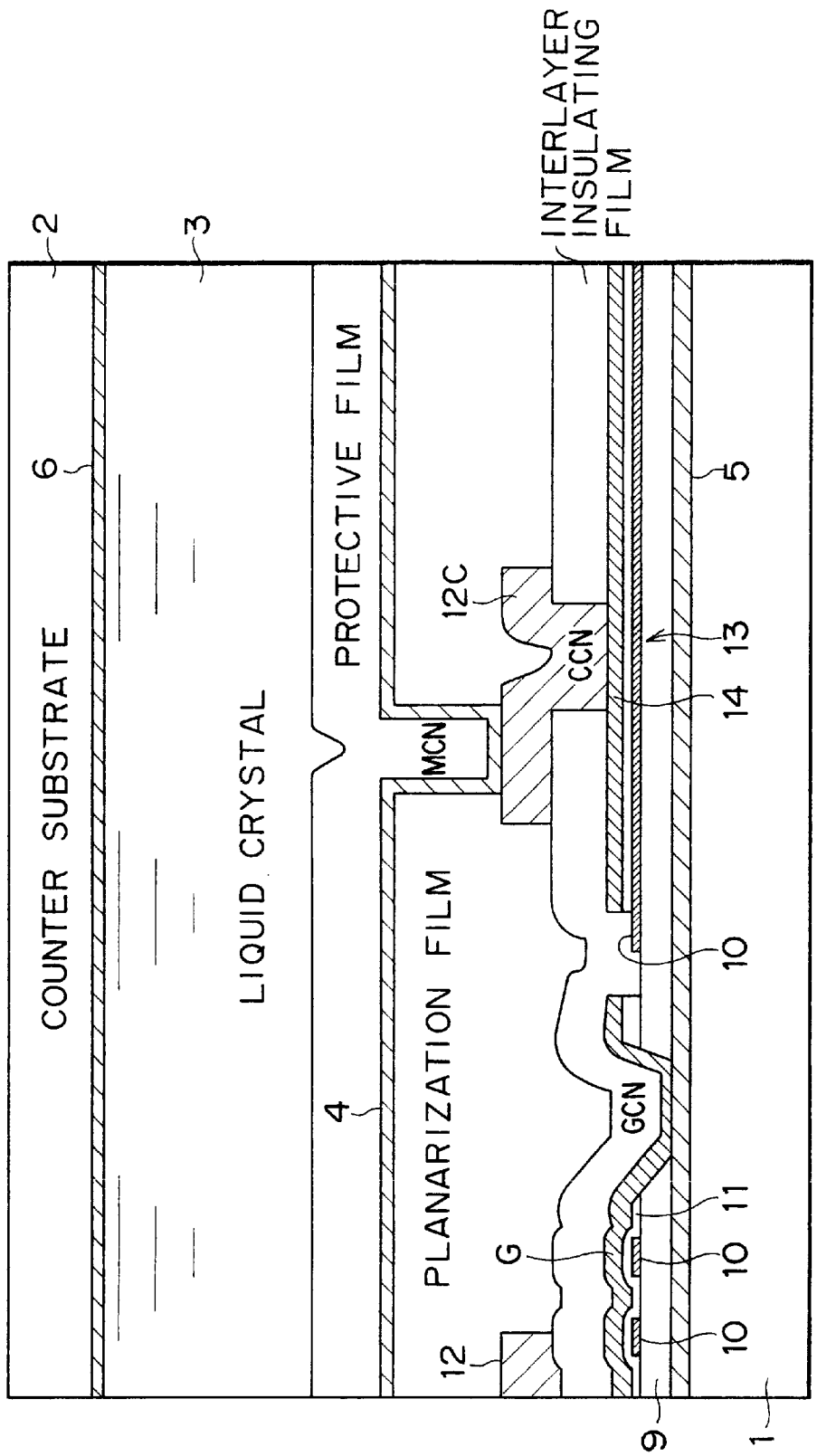

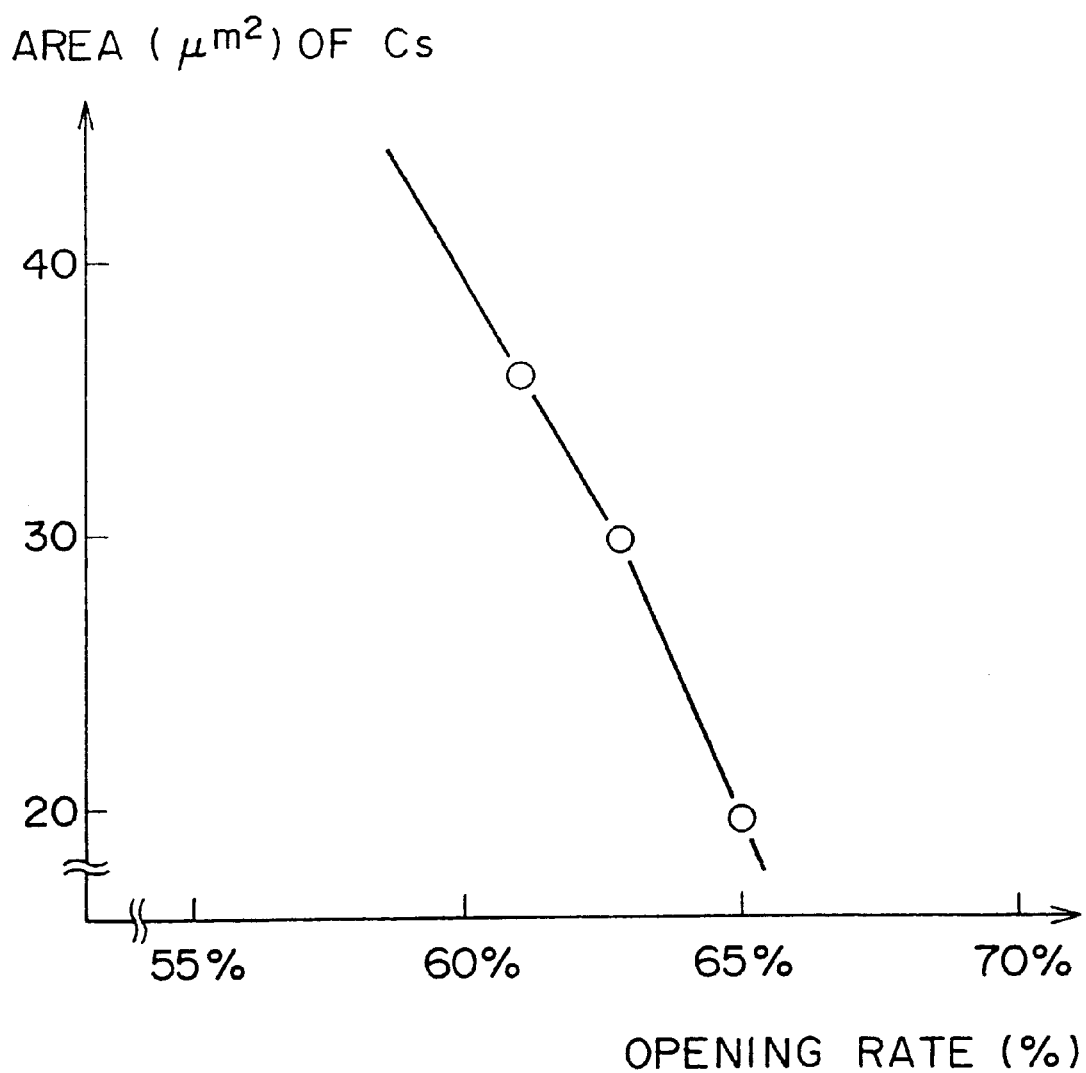

THIN FILM SEMICONDUCTOR DEVICE AND LIQUID CRYSTAL DISPLAY UNIT, AND FABRICATION METHODS THEREOF

RELATED APPLICATION DATA

The present application claims priority to Japanese Application No. P2000-242170 filed Aug. 10, 2000, which application is incorporated herein by reference to the extent permitted by law.

BACKGROUND OF THE INVENTION

The present invention relates to a thin film semiconductor device and a liquid crystal display unit, and fabrication methods thereof. In particular, the present invention concerns a gate interconnection structure and a light shield structure for thin film transistors integrated on a thin film semiconductor.

Thin film semiconductors, on each of which thin film transistors and pixel electrodes are integrated, are being widely used for substrates for driving liquid crystal display units. In particular, a thin film semiconductor device built in a liquid crystal display unit for a projector is essential to have a light shield structure for shielding thin film transistors from intensive light coming from a liquid source of the projector. One example of such a liquid crystal display unit is shown in FIG. 5. As shown in this figure, the liquid crystal display unit uses a thin film transistor for driving each pixel electrode 8. The thin film transistor is typically composed of a high temperature polysilicon TFT; however, it may be composed of a low temperature polysilicon TFT or an amorphous silicon TFT. The liquid crystal display unit shown in the figure is disclosed, for example, in Japanese Patent Laid-open No. Hei 2000-131716. As shown in the figure, the liquid crystal display unit includes a substrate 1 (quartz for supporting TFTs) having TFTs 7 as pixel transistors and a counter substrate 2, with liquid crystal 3 held between the substrate 1 and the counter substrate 2. The counter substrate 2 has a counter electrode 6.

Referring to FIG. 5, the substrate 1 has a pixel electrode 8 in an upper layer portion, and a TFT (thin film transistor, which has a top gate structure herein) in a lower layer portion. The TFT 7 is used as a switching element for driving the pixel electrode 8. The TFT 7 has, as an active layer, a semiconductor thin film 10 which is made from first layer polysilicon. A gate electrode G is formed on the semiconductor thin film 10 via a gate insulating film 11 made from SiO$_2$. The gate electrode G is made from second layer polysilicon. The TFT 7 has a source region S and a drain region D on both sides of the gate electrode G. LDD regions 71 and 72 are formed at end portions of the source and drain regions, respectively. Extraction electrodes 12A and 12B are connected to the source region S and the drain region D, respectively. Each of the extraction electrodes 12A and 12B is made from an aluminum based material such as aluminum. The extraction electrode 12A is electrically connected to the source region S of the TFT 7 via a contact hole SCN, and the extraction electrode 12B is electrically connected to the drain region D of the TFT 7 via a contact hole DCN.

The semiconductor thin film 10 includes an auxiliary capacitance (Cs) 13. The auxiliary capacitance (Cs) 13 is formed by holding a dielectric film made from, for example, SiO$_2$ forming the gate insulating film 11 between the first layer polysilicon forming the semiconductor thin film 10, that is, the TFT 7, and the second layer polysilicon forming a semiconductor thin film 14, that is, the gate electrode G.

Light shield layers 4M and 4P are formed in an intermediate layer portion between the upper layer portion having the pixel electrode 8 and the lower layer portion having the TFT 7. The light shield layers 4M and 4P are located on the counter substrate 2 side with respect to the TFT 7, that is, on the light coming side, and therefore, they are called "upper side light shield layers". That is to say, the upper side light shield layers herein are composed of the mask shield layer 4M and the pad shield layer 4P. With the aid of the two upper side light shield layers (mask shield layer 4M and pad shield layer 4P) and the extraction electrodes 12A and 12B (each of which is made from aluminum herein) overlapped to the upper side light shield layers, the overall pixel region except for a pixel opening is shielded from light coming from the counter substrate 2 side. Each of the mask shield layer 4M and the pad shield layer 4P is made from a conductive material, for example, a metal such as Ti. The mask shield layer 4M is continuously patterned along the row direction (cross direction) of the pixels, and shields the TFT at least partially from external light. The pad shield layer 4P is patterned discretely for each pixel, and contributes to the contact with the pixel electrode 8. To be more specific, the pixel electrode 8 is connected to the pad shield layer 4P via contact hole PCN. The pad shield layer 4P is connected to the extraction electrode 12B via a contact hole JCN. The extraction electrode 12B is, as described above, connected to the drain region D of the TFT 7 via the contact hole DCN. By providing the mask shield layer 4M and the pad shield layer 4P and the extraction electrodes 12A and 12B overlapped to the shield layers 4M and 4P, the overall pixel region except for the pixel opening can be shielded from light coming from the counter substrate side.

On the other hand, a light shield layer 5 is formed on a portion, opposed to the counter substrate 2 side, of the pixel transistor portion. This light shield layer 5 is called "lower light shield layer". At least the end portions of the source and drain of the pixel transistor 7, and the LDD regions 71 and 72 are formed at the end portions of the source and drain thus shielded from external light. In general, the lower light shield layer 5 is made from a silicide of a refractory metal, such as WSi and has a thickness of 200 nm.

To satisfy recent strong demands toward higher luminance of a liquid crystal projector, the liquid crystal panel of the type shown in FIG. 5 has been required to be improved in terms of its transmittance. At the same time, the liquid crystal panel shown in FIG. 5 has been required to keep a high image quality even under a condition with a large quantity of light coming from a light source for a projector. To meet these market requirements for the liquid crystal panel of the type shown in FIG. 5, there have been adopted a method (1) of improving the transmittance by increasing the pixel opening rate, and a method (2) of keeping a high image quality by increasing the area of an auxiliary capacitance (Cs). The methods (1) and (2), however, are essentially inconsistent with each other. Namely, if the auxiliary capacitance (Cs) is increased, the pixel opening rate is reduced. The reason why the methods (1) and (2) have been simultaneously adopted is due to the fact that there has been a margin of the layout of pixels. However, along with tendency toward higher definition of a liquid crystal projector, it has been difficult to realize the layout of pixels with such a margin, and it has become impossible to achieve higher pixel opening rate on the basis of the related art pixel structure.

FIG. 6 is a schematic plan view of the prior art liquid crystal display unit shown in FIG. 5, particularly, one pixel region of the liquid crystal display unit. As shown in the figure, the liquid crystal display unit includes a plurality of signal interconnections 12 and gate interconnections crossing the signal interconnections 12. Pixels are provided at crossing points between the signal interconnections extending to column direction (longitudinal direction) and the gate interconnections extending in the row direction (cross direction). As described above, the pixel includes the pixel electrode, the thin film transistor for driving the pixel electrode, and the light shield band (light shield layer) for shielding the thin film transistor from external light. The thin film transistor has, as the active layer, the semiconductor thin film 10. The source region of the semiconductor thin film 10 is connected to the signal interconnection 12 via the contact hole SCN; the drain region thereof is connected to the pixel electrode (not shown) via the contact hole DCN; and the gate electrode G thereof is formed as part of the gate interconnection. In addition, the gate interconnection is formed of the semiconductor thin film (made from second layer polysilicon) 14 different from the semiconductor thin film (made from first layer polysilicon) 10. The pixel also includes the auxiliary capacitance 13. The auxiliary capacitance 13 has such a stacked structure that the dielectric thin film being the same as the gate insulating film is held between the semiconductor thin film (first layer polysilicon) 10 and the semiconductor thin film (second layer polysilicon) 14. The semiconductor thin film 10 forming the lower electrode of the auxiliary capacitance 13 exhibits the same potential as that of the drain of the thin film transistor, and the semiconductor thin film 14 forming the upper electrode of the auxiliary capacitance 13 is connected to the upper side extraction electrode (not shown) made from aluminum via a contact hole CCN. The extraction electrode is further connected to the upper side mask shield layer via a contact hole MCN. The pixel electrode (not shown) is connected to the drain region D of the thin film transistor via the contact holes PCN, JCN and DCN. As shown in the figure, the gate electrode G is formed of the semiconductor thin film 14 (second layer polysilicon) which extends in the cross direction, to form the gate interconnection. Part of the semiconductor thin film 14, which is taken as the upper electrode of the auxiliary capacitance 13, exhibits a potential different from that of the gate interconnection. Accordingly, although both the gate interconnection and the upper electrode of the auxiliary capacitance 13 are formed of the same semiconductor thin film 14, they are required to be electrically separated to each other with a specific gap (GAP) put therebetween. That is to say, in this pixel structure, since the gate interconnection and the upper electrode of the auxiliary capacitance 13 are disposed in parallel to each other, the gap (GAP) must be provided therebetween, with a result that the pixel opening rate is reduced. To improve the pixel operating rate, as is easily understood, it is effective to form the gate interconnection and the upper electrode of the auxiliary capacitance 13 as separate layers; however, the prior art structure shown in FIG. 6 has failed to examine such a layout of the gate interconnection and the upper electrode of the auxiliary capacitance 13.

FIG. 7 is a graph showing a relationship between a pixel opening rate and the area of the auxiliary capacitance (Cs) in the prior art structure shown in FIG. 6. As the pixel opening rate is increased, the area of the auxiliary capacitance is sacrificed and is significantly reduced. This is because the gate interconnection and the upper electrode of the auxiliary capacitance (auxiliary capacitance interconnection) are formed of the same layer and are disposed in parallel to each other. Such a parallel layout of the gate interconnection and the auxiliary capacitance interconnection makes it difficult to improve the pixel opening rate while ensuring the area of the auxiliary capacitance.

SUMMARY OF THE INVENTION

An object of the present invention is to improve a pixel opening rate of a thin film semiconductor device used as a drive substrate of an active matrix type liquid crystal display unit.

To achieve the above object, according to the present invention, there is provided a thin film semiconductor device including: a plurality of signal interconnections and a plurality of gate interconnections crossing the signal interconnections, and pixels disposed at crossing points between the signal and gate interconnections, the signal and gate interconnections and the pixels being provided on an insulating substrate; wherein each of the pixels includes at least a pixel electrode, a thin film transistor for driving the pixel electrode, and a light shield band for shielding the thin film transistor from external light; and a source of the thin film transistor is connected to one of the signal interconnections, a drain of the thin film transistor is connected to the pixel electrode, and a gate electrode of the thin film transistor is connected to one of the gate interconnections. This thin film semiconductor device is characterized in that the light shield band is formed of a first conductive layer, and at least part of the light shield band is used as the gate interconnection; the gate electrode is formed of a second conductive layer different from the first conductive layer; and the first conductive layer used for the gate interconnection is electrically connected to the second conductive layer forming the gate electrode within each pixel region.

Preferably, the second conductive layer forming the gate electrodes is separated from each other for each pixel region, and each of the separated parts of the second conductive layer is electrically connected to the first conductive layer used for the gate interconnection in each pixel region.

Preferably, the first conductive layer forming the gate interconnection is separated from each other for each pixel region, and each of the separated parts of the first conductive layer is electrically connected to the second conductive layer forming the gate electrode within each pixel region.

Preferably, the light shield band is composed of two conductive layers for shielding the thin film transistor from above and below, and one of the two conductive layers is used as the first conductive layer for the gate interconnection.

Preferably, the light shield band is composed of a single conductive layer for shielding the thin film transistor from either above or below, and the single conductive layer is used as the first conductive layer for the gate interconnection.

Preferably, each of the pixels includes an auxiliary capacitance composed of a dielectric substance held between a pair of upper and lower electrodes in order to hold signal charges written from the signal interconnection into the pixel electrode via the thin film transistor; and one of the pair of upper and lower electrodes is formed of the same layer as the second conductive layer forming the gate electrode.

With these configurations, the light shield band for shielding the thin film transistor from external light is formed of the first conductive layer, and at least part of the light shield band is used as the gate interconnection. On the other hand, the gate electrode is formed of the second conductive layer different from the first conductive layer, and is electrically connected to the light shield band within each pixel region. By making use of the light shield layer as the gate interconnection as described above, it is not required to form the gate interconnection and the auxiliary capacitance interconnection with the same layer. For example, by using the lower light shield layer as the gate interconnection, the auxiliary capacitance interconnection formed of the same layer as that forming the gate electrode can be overlapped on the gate interconnection. Since it is not required to ensure the gap (GAP) between the gate interconnection and the auxiliary capacitance interconnection which are made from the same layer, the pixel opening rate can be correspondingly improved.

BRIEF DESCRIPTION OF THE DRAWINGS

FIG. 2 is a schematic sectional view of the liquid crystal display unit shown in FIG. 1;

FIGS. 3A and 3B are each an equivalent circuit diagram of one pixel region, wherein FIG. 3A shows the circuit of the liquid crystal display unit shown in FIGS. 1 and 2, and FIG. 3B shows the circuit of a reference example;

FIG. 7 is a graph showing a relationship between a pixel opening rate and the area of an auxiliary capacitance.

DETAILED DESCRIPTION OF THE PREFERRED EMBODIMENT

Figure 1:
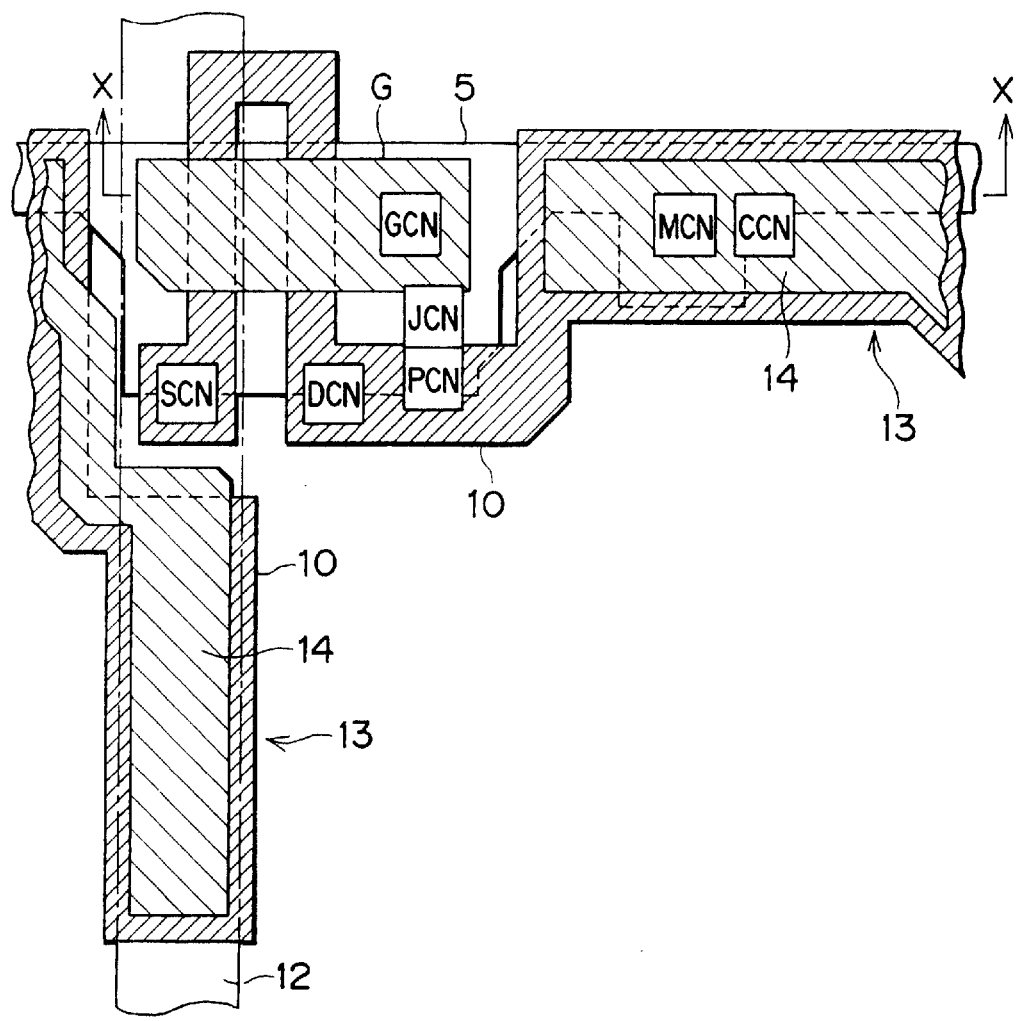
FIG. 1 is a schematic plan view of a liquid crystal display unit of the present invention.

Hereinafter, a preferred embodiment of the present invention will be described in detail with reference to the accompanying drawings. FIG. 1 is a schematic plan view showing one example of a liquid crystal display unit of the present invention, particularly, only one pixel region of the liquid crystal display unit. In particular, this figure shows a planar configuration of a thin film semiconductor device on the drive substrate side of the liquid crystal display unit. The thin film semiconductor device includes, on an insulating substrate, a plurality of signal interconnections 12 and a plurality of gate interconnections crossing the signal interconnections 12, and pixels disposed at crossing points between the signal and gate interconnections. It is to be noted that in the figure, there is shown only one pixel disposed at a crossing point between one signal interconnection 12 extending in the longitudinal direction and one gate interconnection extending in the cross direction. Each pixel includes at least a pixel electrode (not shown), a thin film transistor for driving the pixel electrode, and a light shield layer (light shield band) 5 for shielding the thin film transistor from external light. The thin film transistor includes a semiconductor thin film (made from first layer polysilicon) 10 formed as a device region on the lower side light shield layer 5. A source of the thin film transistor is connected to the signal interconnection 12 via a contact hole SCN. A drain of the thin film transistor is connected to the pixel electrode (not shown) via contact holes DCN, JCN and PCN. A gate electrode G of the thin film transistor is connected to the gate interconnection. It is to be noted that the gate electrode G is formed of another semiconductor thin film (made from second layer polysilicon) 14 disposed over the semiconductor thin film (made from first layer polysilicon) 10.

According to features of the present invention, the light shield layer 5 is formed of a first conductive layer, and at least part of the light shield layer 5 is used as the gate interconnection; the gate electrode G is formed of a second conductive layer (that is, the semiconductor thin film 14 heavily doped with an impurity) different from the first conductive layer; and the first conductive layer used for the gate interconnection and the second conductive layer (semiconductor thin film 14) forming the gate electrode G are electrically connected to each other via a contact hole GCN within each pixel region. In summary, according to the present invention, the layer forming the gate electrode G is different from the layer forming the gate interconnection, and both the gate electrode G and the gate interconnection are three-dimensionally connected to each other via the contact hole GCN within each pixel region. As a further feature of the present invention, the second conductive layer (semiconductor thin film 14) for forming the gate electrodes G is separated from each other for each pixel, and each of the separated parts (gate electrodes G) of the second conductive layer is electrically connected to the first conductive layer (light shield layer 5) used for the gate interconnection within each pixel region.

The pixel includes an auxiliary capacitance 13 in addition to the above-described thin film transistor and pixel electrode. The auxiliary capacitance 13 functions to hold signal charges written from the signal interconnection 12 into the pixel electrode via the thin film transistor so as to keep an image quality. The auxiliary capacitance 13 has a stacked structure in which a dielectric substance is held between a pair of upper and lower electrodes. The upper electrode of the auxiliary capacitance 13 is formed of the same layer as the second conductive layer (semiconductor thin film 14) forming the gate electrode G. The lower electrode of the auxiliary capacitance 13 is formed of the same layer as the semiconductor thin film 10. The dielectric substance of the auxiliary capacitance 13 is formed of the same insulating film as a gate insulating film held between the pair of upper and lower electrodes 14 and 10. As is apparent from the figure, the auxiliary capacitance 13 can be overlapped to the light shield layer 5 forming the gate interconnection. As a result, according to the structure of the present invention, the pixel opening rate can be significantly enlarged as compared with the related art structure. Such a structure of the present invention is realized by replacing part of the gate interconnection, which has been the same layer as the layer forming the gate electrode G, with a different layer, that is, the light shield layer 5. To be more specific, the gate interconnection is formed of the lower light shield layer 5 made from WSi for example, and the gate electrode G is formed of the semiconductor thin film 14 (made from second layer polysilicon) like the related art structure. The gate interconnection and the gate electrode G are electrically connected to each other via the contact hole GCN. On the other hand, the upper electrode of the auxiliary capacitance 13 is formed of the semiconductor thin film 14 (made from the second layer polysilicon) which is the same layer as that forming the gate electrode G. Since the layer forming the gate interconnection is different from the layer forming the upper electrode (auxiliary capacitance interconnection) of the auxiliary capacitance 13, the auxiliary capacitance 13 can be formed over the light shield layer 5 forming the gate interconnection, to thereby significantly improve the pixel opening rate.

FIG. 2 is a sectional view, taken on line X—X of FIG. 1, showing a structure of the liquid crystal display unit. Referring to this figure, the liquid crystal display unit includes a pair of substrates 1 and 2 jointed to each other with a specific gap held therebetween, and liquid crystal 3 held in the gap. One substrate 1 has, as described above, the plurality of signal interconnections 12 and the plurality of gate interconnections crossing the signal interconnections 12, and the pixels disposed at crossing points between the signal and gate interconnections. The other substrate (counter substrate) 2 has an electrode (counter electrode) 6 facing to respective pixels.

The lower light shield layer 5 is formed on the surface of the lower substrate 1, and the thin film transistor and the auxiliary capacitance 13 are formed thereon via an insulating film 9. The thin film transistor has a top gate structure in which the gate electrode G is disposed on the semiconductor thin film 10 of a dual structure via a gate insulating film 11. As described above, the gate electrodes G are separated from each other for each pixel region, and each gate electrode G is electrically connected to the light shield layer 5 serving as the gate interconnection via the contact hole GCN. On the other hand, the auxiliary capacitance 13 is composed of the lower semiconductor thin film 10, the upper semiconductor thin film 14, and the gate insulating film 11 held therebetween. As is apparent from the figure, the upper electrode of the auxiliary capacitance 13 and the gate electrode G are formed of the same semiconductor thin film (made from second layer polysilicon) 14. The thin film transistor and the auxiliary capacitance 13 configured as described above are covered with an interlayer insulating film. The signal interconnection 12 and an extraction electrode 12C are formed on the interlayer insulating film. Each of the signal interconnection 12 and the extraction electrode 12C is made from aluminum, and the surfaces thereof are covered with a planarization film. An upper light shield layer 4 is formed on the planarization film. In this way, according to this embodiment, the light shield band for shielding the thin film transistor from external light is composed of two conductive layers for shielding the thin film transistor from above and below, and one of the two conductive layers is used as the first conductive layer for the gate interconnection. Alternatively, the light shield band may be composed of a single conductive layer for shielding the thin film transistor from either above or below, and the single conductive layer be used as the first conductive layer for the gate interconnection. In this embodiment, the upper electrode of the auxiliary capacitance 13 is electrically connected to the extraction electrode 12C via a contact hole CCN. The extraction electrode 12C is further electrically connected to the upper light shield layer 4 via a contact hole MCN. With this connection, a specific potential is applied to the upper electrode of the auxiliary capacitance 13. The upper light shield layer 4 is covered with a protective film, and a pixel electrode (not shown) is formed thereon.

A method of fabricating the liquid crystal display unit according to the present invention will be described with reference to FIG. 2. The liquid crystal display unit includes the pair of the substrates 1 and 2 jointed to each other with the specific gap put therebetween, and the liquid crystal 3 held in the gap. To fabricate such a liquid crystal display unit, a plurality of signal interconnections 12 and a plurality of gate interconnections crossing the signal interconnections, and pixels disposed at the crossing points between the signal and gate interconnections are formed on one substrate 1, and an electrode 6 is formed on the other substrate 2 in such a manner as to face to respective pixels. At least a pixel electrode, a thin film transistor for driving the pixel electrode, and a light shield band 5 for shielding the thin film transistor from external light are formed in each pixel region. A source of the thin film transistor is connected to the signal interconnection 12, a drain thereof is connected to the pixel electrode, and a gate electrode G thereof is connected to the gate interconnection. In this case, the light shield band 5 is formed of a first conductive layer, and at least part of the light shield band is used for the gate interconnection. The gate electrode G is formed of a second conductive layer 14 different from the first conductive layer. The first conductive layer used for the gate interconnection is electrically connected to the second conductive layer 14 forming the gate electrode G via a contact hole GCN within each pixel region. In this embodiment, the light shield band is composed of two conductive layers for shielding the thin film transistor from above and below, and one light shield band 5 is used as the first conductive layer for the gate interconnection. An auxiliary capacitance 13 is formed in each pixel region by holding a gate insulating film 11 as a dielectric substance between a pair of upper and lower electrodes (10, 14) in order to hold signal charges written from the signal interconnection 12 into the pixel electrode via the thin film transistor. One of the pair of the upper and lower electrodes is formed of the same layer as the second conductive layer 14 forming the gate electrode G.

Figure 3A:
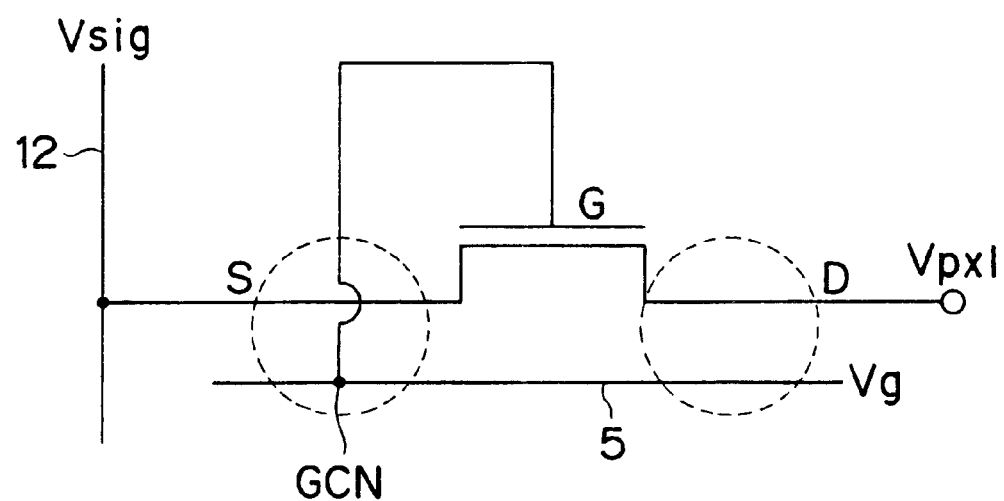
Figure 3B:
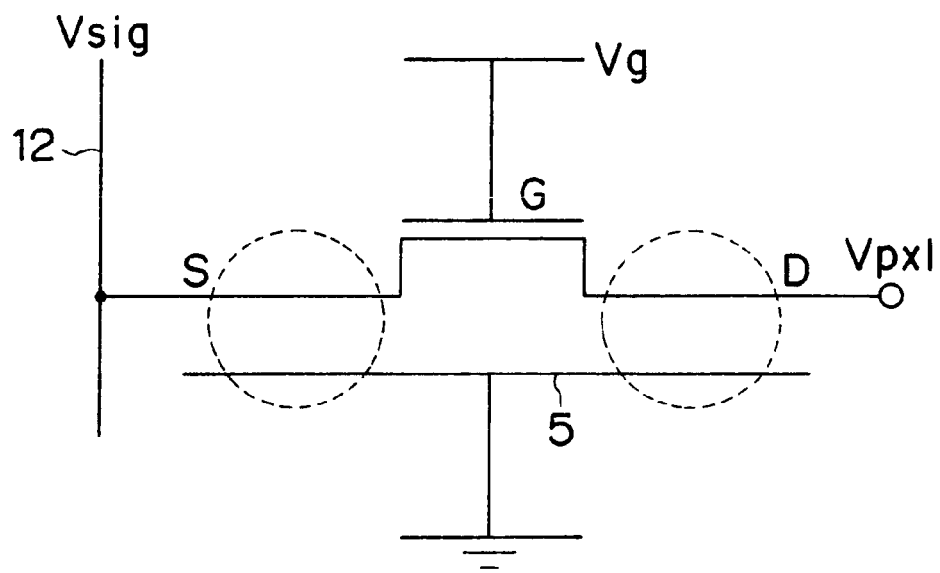

FIGS. 3A and 3B are schematic diagrams each showing an equivalent circuit for one pixel, wherein FIG. 3A shows the circuit of the liquid crystal display unit of the present invention, and FIG. 3B shows the circuit of the reference example. In the reference example shown in FIG. 3B, the lower light shield layer 5 is not taken as part of the gate interconnection and is connected to the ground potential. In such a configuration, a parasitic transistor due to the metal light shield layer 5 occurs in the LDD region as shown circles depicted by dotted lines. Since the potential of the light shield layer 5 is fixed, that is, usually grounded, to act in the direction of usually turning off the parasitic transistor. To prevent the above inconvenience, it is impossible to reduce the concentration of an impurity of the LDD region by a specific value or more. However, along with the tendency to increase the quantity of light, it has been required to reduce the concentration of an impurity of the LDD region to about one-third the present impurity concentration in order to improve the image quality.

In the configuration shown in FIG. 3A, although a parasitic transistor due to the metal light shield layer 5 occurs like the reference example, the potential of the light shield layer 5 is usually kept at a value equal to a gate potential via the contact hole GCN. Accordingly, the turn on/off of the parasitic transistor surrounded by dotted lines is perfectly synchronized with the substantive thin film transistor. As a result, it is possible to significantly reduce the concentration of an impurity in the LDD region, and hence to improve the image quality. In addition, an image signal Vsig supplied to the signal interconnection 12 is written from the source region S of the thin film transistor TFT into the pixel electrode via the drain region D. In the figure, a potential written in the pixel electrode is designated by character Vpxl, and a potential applied to the gate electrode G of the thin film transistor is designated by character Vg.

Figure 4A:
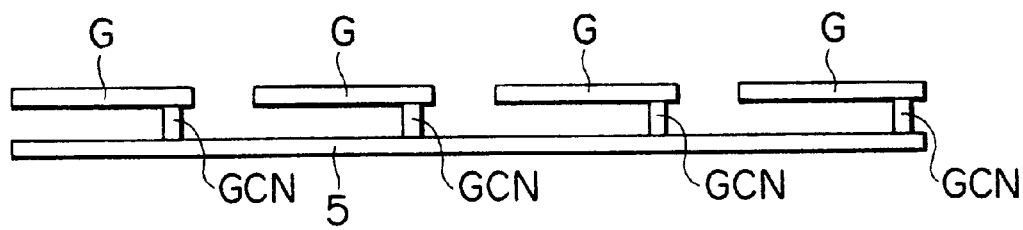
FIGS. 4A to 4D are schematic views each showing an electrical connection relationship between a pixel electrode and a light shield layer in the liquid crystal display unit of the present invention.

FIGS. 4A to 4D are schematic views each showing a connection relationship between the gate electrode G and the light shield layer 5 serving as the gate interconnection. FIG. 4A schematically shows the connection relationship according to the embodiment shown in FIG. 1, in which pixel electrodes G are separated from each other for each pixel region and the light shield layer 5 forming the gate interconnection extends through the pixels. Each of the separated gate electrodes G is electrically connected to the lower light shield layer 5 via the corresponding contact hole GCN. The multi-layer structure formed by overlapping the metal thin layer, the semiconductor thin film layer, and the like to each other causes a side reaction of increasing a deformed amount of the substrate. This exerts adverse effect on control in assembly and mounting steps of a panel. In particular, it has been revealed that the continuous formation of the gate interconnection formed of the semiconductor thin film (made from second layer polysilicon) along the cross direction of the panel becomes a large cause of deformation of the substrate. On the contrary, according to the present invention, as schematically shown in FIG. 4A, the gate electrodes G made from second layer polysilicon are separated from each other for each pixel region, with a result that the deformed amount of the substrate can be reduced. Further, since the gate electrode G is not used as the interconnection unlike the related art structure, the thickness of the gate electrode G can be made small. This is effective to further reduce the deformed amount of the substrate.

Figure 4B:
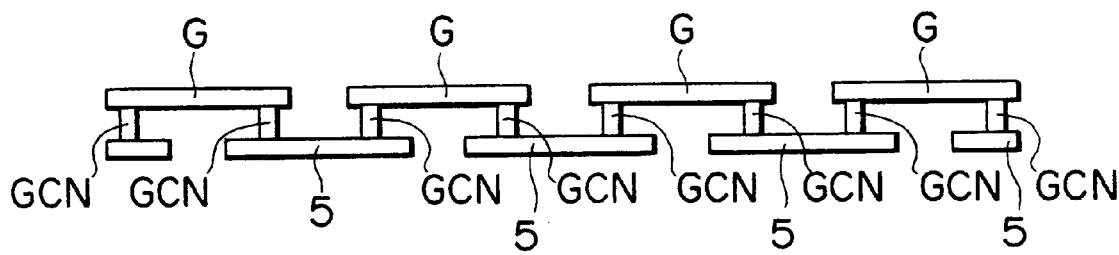

In the connection relationship shown in FIG. 4B, not only the gate electrodes G but also the lower light shield layers 5 for forming the gate interconnection are separated from each other for each pixel region. The separated gate electrodes G and lower light shield layers 5 are sequentially, electrically connected to each other via contact holes GCN of the number of two pieces for each pixel. Since the lower light shield layers 5 are also separated from each other, it is possible to further reduce the deformed amount of the substrate.

Figure 4C:
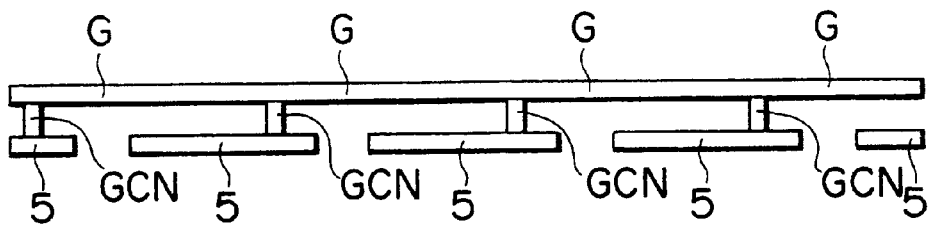
Figure 4D:
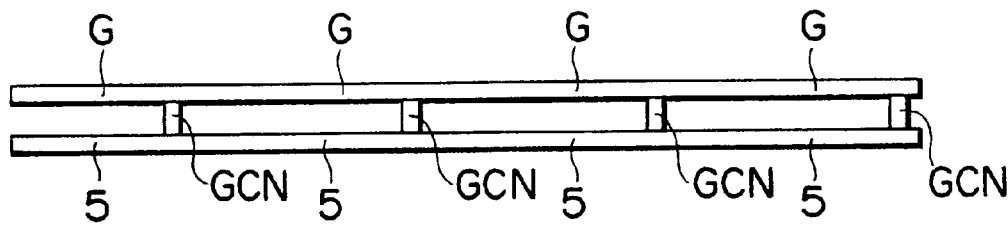
Figure 5:
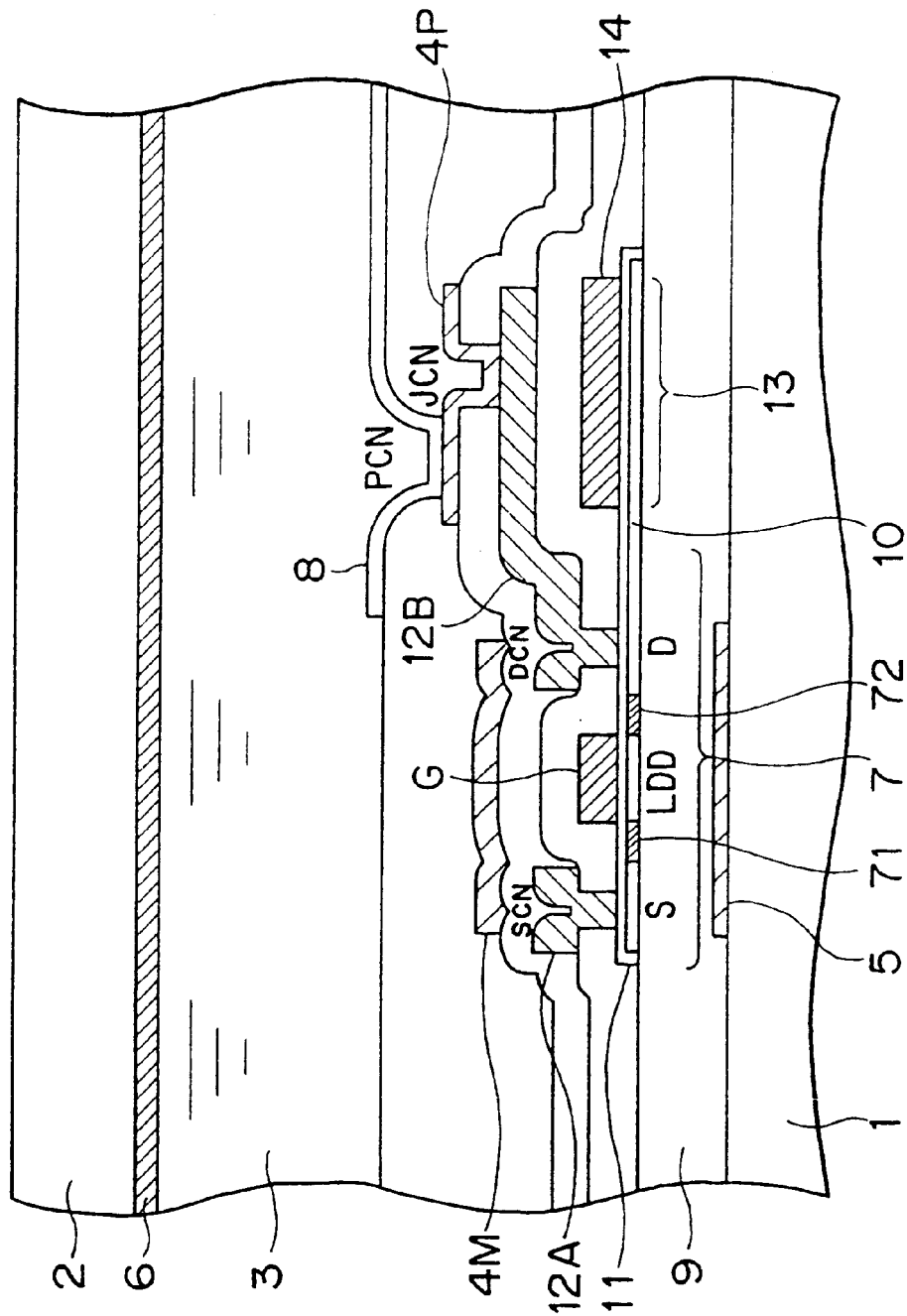
FIG. 5 is a sectional view showing one example of a prior art liquid crystal display unit.
Figure 6:
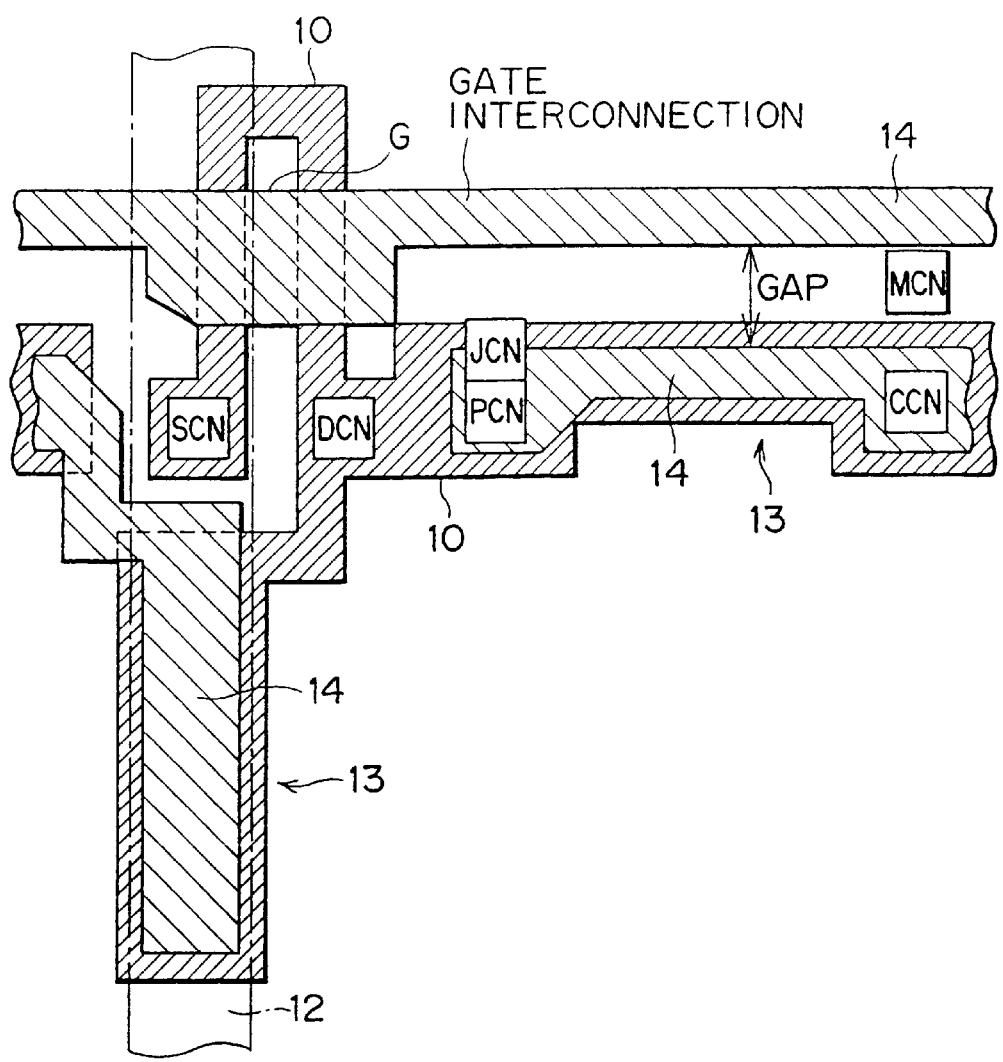
FIG. 6 is a plan view of the prior art liquid crystal display unit shown in FIG. 5.

In the connection relationship shown in FIG. 4C, the light shield layers 5 are separated from each other for each pixel region, but the gate electrode G extends through the pixels. In the connection relationship shown in FIG. 4D, each of the gate electrode G and the lower light shield layer 5 extends through the pixels, and both the gate electrode G and the lower light shield layer 5 are connected to each other via contact holes GCN provided for each pixel region. With this configuration, even if one of the upper and lower two conductive layers is disconnected, the electric conduction can be ensured by the other one of the conductive layers, to thereby obtain a merit of preventing occurrence of a failure.

As described above, according to the present invention, the pixel opening rate can be improved by making use of the light shield layer as the gate interconnection. Also it is possible to realize a double-gate structure in which the semiconductor thin film as an active layer of the thin film transistor is held, from above and below, between the light shield layer serving as the gate interconnection and the gate electrode, and hence to increase the design margin of the thin film transistor. For example, the double-gate structure is effective to reduce the concentration of an impurity of the LDD region and hence to correspondingly lower leakage of light from the thin film transistor. Further, by separating the gate electrodes or light shield layers serving as the gate interconnection from each other for each pixel region, it is possible to suppress the deformation of the substrate.

While the preferred embodiment of the present invention has been described using the specific terms, such description is for illustrative purposes only, and it is to be understood that changes and variations may be made without departing from the spirit or scope of the following claims.

What is claimed is:

1. In a thin film semiconductor device comprising:
   a plurality of signal interconnections and a plurality of gate interconnections crossing said signal interconnections, and pixels disposed at crossing points between said signal and gate interconnections, said signal and gate interconnections and said pixels being provided on an insulating substrate;

wherein each of said pixels includes at least a pixel electrode, a thin film transistor for driving said pixel electrode, and a light shield band for shielding said thin film transistor from external light; and a source of said thin film transistor is connected to one of said signal interconnections, a drain of said thin film transistor is connected to said pixel electrode, and a gate electrode of said thin film transistor is connected to one of said gate interconnections;

the improvement wherein
      said light shield band is formed of a first conductive layer, and at least part of said light shield band is used as said gate interconnection;
      said gate electrode is formed of a second conductive layer different from said first conductive layer; and
      said first conductive layer used for said gate interconnection is electrically connected to said second conductive layer forming said gate electrode within each pixel region.

2. A thin film semiconductor device according to claim 1, wherein portions of said second conductive layer forming said gate electrodes are separated from each other into respective portions for each pixel region, and each of the separated portions of said second conductive layer is electrically connected to said first conductive layer used for said gate interconnection in each pixel region.

3. A thin film semiconductor device according to claim 1, wherein portions of said first conductive layer forming said gate interconnection are separated from each other into respective portions for each pixel region, and each of the separated portions of said first conductive layer is electrically connected to said second conductive layer forming said gate electrode within each pixel region.

4. A thin film semiconductor device according to claim 1, wherein said light shield band is composed of two conductive layers for shielding said thin film transistor from above and below, and one of said two conductive layers is used as said first conductive layer for said gate interconnection.

5. A thin film semiconductor device according to claim 1, wherein said light shield band is composed of a single conductive layer for shielding said thin film transistor from either above or below, and said single conductive layer is used as said first conductive layer for said gate interconnection.

6. A thin film semiconductor device according to claim 1, wherein each of said pixels includes an auxiliary capacitance composed of a dielectric substance held between a pair of upper and lower electrodes in order to hold signal charges written from said signal interconnection into said pixel electrode via said thin film transistor; and
   one of said pair of upper and lower electrodes is formed of the same layer as said second conductive layer forming said gate electrode.

7. In a liquid crystal display unit comprising:
   a pair of substrates jointed to each other with a specific gap held therebetween, and liquid crystal held in said gap;

wherein one substrate has a plurality of signal interconnections and a plurality of gate interconnections crossing said signal interconnections, and pixels disposed at crossing points between said signal and gate interconnections, and the other substrate has an electrode facing to respective pixels;

each of said pixels includes at least a pixel electrode, a thin film transistor for driving said pixel electrode, and a light shield band for shielding said thin film transistor from external light; and a source of said thin film transistor is connected to one of said signal interconnections, a drain of said thin film transistor is connected to said pixel electrode, and a gate electrode of said thin film transistor is connected to one of said gate interconnections;

the improvement wherein said light shield band is formed of a first conductive layer, and at least part of said light shield band is used as said gate interconnection;

said gate electrode is formed of a second conductive layer different from said first conductive layer; and said first conductive layer used for said gate interconnection is electrically connected to said second conductive layer forming said gate electrode within each pixel region.

8. A liquid crystal display unit according to claim 7, wherein portions of said second conductive layer forming said gate electrodes are separated from each other into respective portions for each pixel region, and each of the separated portions of said second conductive layer is electrically connected to said first conductive layer used for said gate interconnection in each pixel region.

9. A liquid crystal display unit according to claim 7, wherein portions of said first conductive layer forming said gate interconnection are separated from each other into respective portions for each pixel region, and each of the separated portions of said first conductive layer is electrically connected to said second conductive layer forming said gate electrode within each pixel region.

10. A liquid crystal display unit according to claim 7, wherein said light shield band is composed of two conductive layers for shielding said thin film transistor from above and below, and one of said two conductive layers is used as said first conductive layer for said gate interconnection.

11. A liquid crystal display unit according to claim 7, wherein said light shield band is composed of a single conductive layer for shielding said thin film transistor from either above or below, and said single conductive layer is used as said first conductive layer for said gate interconnection.

12. A liquid crystal display unit according to claim 7, wherein each of said pixels includes an auxiliary capacitance composed of a dielectric substance held between a pair of upper and lower electrodes in order to hold signal charges written from said signal interconnection into said pixel electrode via said thin film transistor; and one of said pair of upper and lower electrodes is formed of the same layer as said second conductive layer forming said gate electrode.

13. In a method of fabricating a thin film semiconductor device, said semiconductor device comprising: a plurality of signal interconnections and a plurality of gate interconnections crossing said signal interconnections, and pixels disposed at crossing points between said signal and gate interconnections, said signal and gate interconnections and said pixels being provided on an insulating substrate; wherein each of said pixels includes at least a pixel electrode, a thin film transistor for driving said pixel electrode, and a light shield band for shielding said thin film transistor from external light; and a source of said thin film transistor is connected to one of said signal interconnections, a drain of said thin film transistor is connected to said pixel electrode, and a gate electrode of said thin film transistor is connected to one of said gate interconnections;

the improvement wherein said light shield band is formed of a first conductive layer, and at least part of said light shield band is used as said gate interconnection;

said gate electrode is formed of a second conductive layer different from said first conductive layer; and said first conductive layer used for said gate interconnection is electrically connected to said second conductive layer forming said gate electrode within each pixel region.

14. A method of fabricating a thin film semiconductor device according to claim 13, wherein portions of said second conductive layer forming said gate electrodes are separated from each other into respective portions for each pixel region, and each of the separated portions of said second conductive layer is electrically connected to said first conductive layer used for said gate interconnection in each pixel region.

15. A method of fabricating a thin film semiconductor device according to claim 13, wherein portions of said first conductive layer forming said gate interconnection are separated from each other into respective portions for each pixel region, and each of the separated portions of said first conductive layer is electrically connected to said second conductive layer forming said gate electrode within each pixel region.

16. A method of fabricating a thin film semiconductor device according to claim 13, wherein said light shield band is composed of two conductive layers for shielding said thin film transistor from above and below, and one of said two conductive layers is used as said first conductive layer for said gate interconnection.

17. A method of fabricating a thin film semiconductor device according to claim 13, wherein said light shield band is composed of a single conductive layer for shielding said thin film transistor from either above or below, and said single conductive layer is used as said first conductive layer for said gate interconnection.

18. A method of fabricating a thin film semiconductor device according to claim 13, wherein each of said pixels includes an auxiliary capacitance composed of a dielectric substance held between a pair of upper and lower electrodes in order to hold signal charges written from said signal interconnection into said pixel electrode via said thin film transistor; and one of said pair of upper and lower electrodes is formed of the same layer as said second conductive layer forming said gate electrode.

19. A method of fabricating a liquid crystal display unit, said liquid crystal display unit comprising: a pair of substrates jointed to each other with a specific gap held therebetween, and liquid crystal held in said gap; wherein one substrate has a plurality of signal interconnections and a plurality of gate interconnections crossing said signal interconnections, and pixels disposed at crossing points between said signal and gate interconnections, and the other substrate has an electrode facing to respective pixels; each of said pixels includes at least a pixel electrode, a thin film transistor for driving said pixel electrode, and a light shield band for shielding said thin film transistor from external light; and a source of said thin film transistor is connected to one of said signal interconnections, a drain of said thin film transistor is connected to said pixel electrode, and a gate electrode of said thin film transistor is connected to one of said gate interconnections;

the improvement wherein
said light shield band is formed of a first conductive layer, and at least part of said light shield band is used as said gate interconnection;
said gate electrode is formed of a second conductive layer different from said first conductive layer; and
said first conductive layer used for said gate interconnection is electrically connected to said second conductive layer forming said gate electrode within each pixel region.

20. A method of fabricating a liquid crystal display unit according to claim 19, wherein portions of said second conductive layer forming said gate electrodes are separated from each other into respective portions for each pixel region, and each of the separated portions of said second conductive layer is electrically connected to said first conductive layer used for said gate interconnection in each pixel region.

21. A method of fabricating a liquid crystal display unit according to claim 19, wherein portions of said first conductive layer forming said gate interconnection are separated from each other into respective portions for each pixel region, and each of the separated portions of said first conductive layer is electrically connected to said second conductive layer forming said gate electrode within each pixel region.

22. A method of fabricating a liquid crystal display unit according to claim 19, wherein said light shield band is composed of two conductive layers for shielding said thin film transistor from above and below, and one of said two conductive layers is used as said first conductive layer for said gate interconnection.

23. A method of fabricating a liquid crystal display unit according to claim 19, wherein said light shield band is composed of a single conductive layer for shielding said thin film transistor from either above or below, and said single conductive layer is used as said first conductive layer for said gate interconnection.

24. A method of fabricating a liquid crystal display unit according to claim 19, wherein each of said pixels includes an auxiliary capacitance composed of a dielectric substance held between a pair of upper and lower electrodes in order to hold signal charges written from said signal interconnection into said pixel electrode via said thin film transistor; and one of said pair of upper and lower electrodes is formed of the same layer as said second conductive layer forming said gate electrode.

* * * * *